United States Patent [19]

Kunetka et al.

[11] Patent Number: 4,469,451

[45] Date of Patent: Sep. 4, 1984

[54] METHOD AND APPARATUS FOR MEASURING TEMPERATURE OF AN EARTH FORMATION IN THE PRESENCE OF A RADIO FREQUENCY ELECTROMAGNETIC FIELD

[75] Inventors: Robert E. Kunetka; Donald J. Dowling, both of Houston, Tex.

[73] Assignee: Texaco Inc., White Plains, N.Y.

[21] Appl. No.: 392,815

[22] Filed: Jun. 28, 1982

[51] Int. Cl.³ .................... G01K 13/00; G01K 5/20
[52] U.S. Cl. ..................... 374/136; 324/338;
374/104; 374/137; 374/158; 374/190; 73/154;
374/120
[58] Field of Search .............. 374/136, 105, 104, 101,
374/137, 192, 193, 158, 209, 208, 120, 190;
73/154; 324/338, 344

[56] References Cited

U.S. PATENT DOCUMENTS

| | | | |
|---|---|---|---|
| 1,729,298 | 9/1929 | Stewart | 374/104 |
| 2,328,528 | 8/1943 | McConnel | 374/208 |
| 2,633,025 | 3/1953 | Boice et al. | 73/151 X |
| 2,972,251 | 2/1961 | Harper | 73/154 |
| 4,313,342 | 2/1982 | Poppendiek | 73/154 |
| 4,375,164 | 3/1983 | Dodge et al. | 374/136 X |

FOREIGN PATENT DOCUMENTS

| | | | |
|---|---|---|---|
| 3001314 | 9/1981 | Fed. Rep. of Germany | 374/193 |
| 143181 | 8/1980 | German Democratic Rep. | 324/344 |
| 1558470 | 1/1980 | United Kingdom | 374/158 |

OTHER PUBLICATIONS

IBM Technical Disclosure Bulletin, vol. 8, No. 10, Mar. 1963, 1463, *Heat Transfer Sleeve*, Jako.

*Primary Examiner*—S. Clement Swisher
*Assistant Examiner*—Tom Noland
*Attorney, Agent, or Firm*—Robert A. Kulason; Carl G. Ries; Henry C. Dearborn

[57] ABSTRACT

A method and apparatus for measuring the temperature in a subsurface earth formation that is being heated in situ by subjection to a radio frequency electromagnetic field. It includes lowering a maximum registering thermometer into the formation on a non-conductive flexible line, and holding it there long enough to reach the ambient temperature at that location. Then, the thermometer is raised to the surface fast enough to avoid any significant change on the way up to read that registered maximum.

8 Claims, 4 Drawing Figures

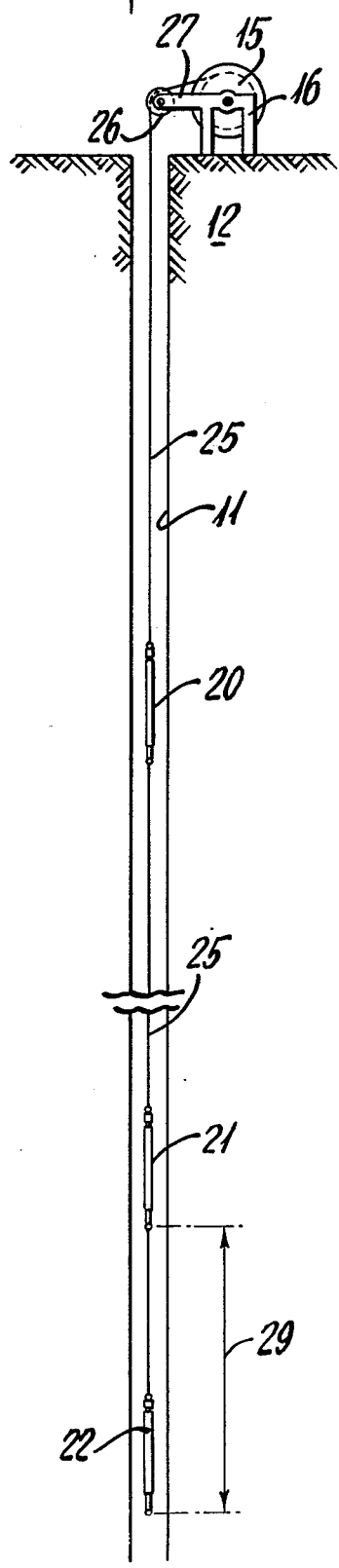
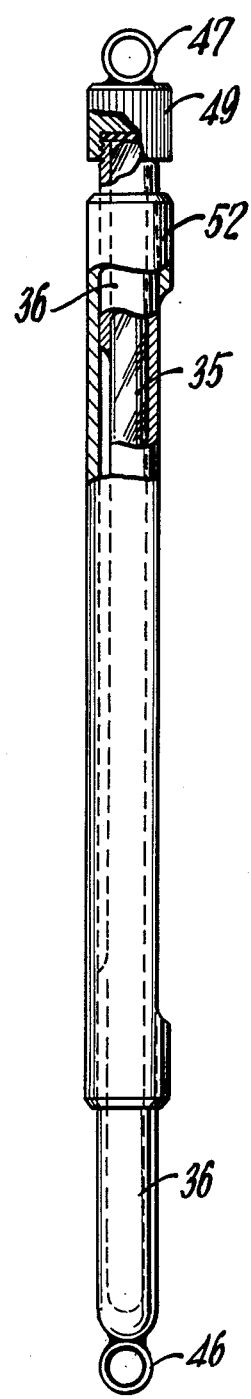
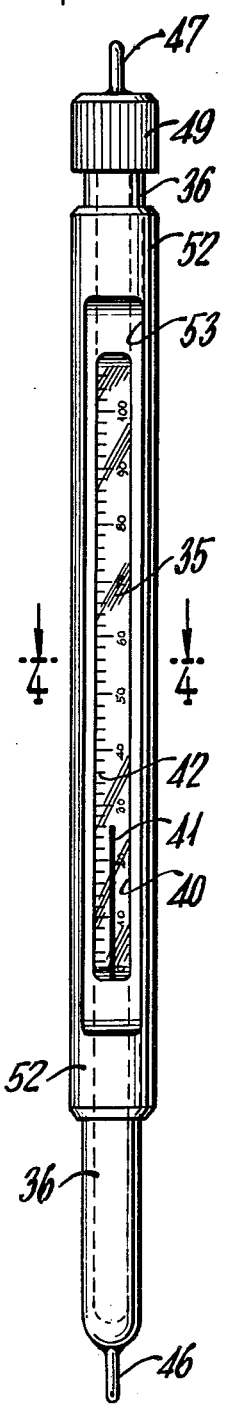
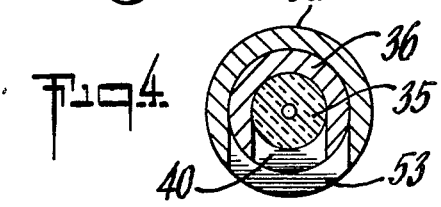

METHOD AND APPARATUS FOR MEASURING TEMPERATURE OF AN EARTH FORMATION IN THE PRESENCE OF A RADIO FREQUENCY ELECTROMAGNETIC FIELD

BACKGROUND OF THE INVENTION

1. Field of the Invention

This invention concerns temperature measurement of earth formations. More specifically, it relates to method and apparatus for measuring temperature of an earth formation in the presence of a radio frequency electromagnetic field.

2. Description of the Prior Art

There is an arrangement shown in U.S. Pat. No. 2,633,025 to E. G. Boice et al dated Mar. 31, 1953. However, that patent provides a thermometer mounted in a drill bit, and it employs a specially constructed mercury thermometer which permits the mercury column to expand out of its restricted passage leaving only the mercury from the maximum temperature. Thereafter, in order to determine the temperature at that maximum, the special thermometer must be reheated along with an indicating thermometer so that when the mercury column just reaches the exit of the special thermometer, the temperature of the other (indicating) thermometer may be read. This involves a cumbersome procedure which means that the maximum temperature found by the special thermometer is not readily determined after it has been returned to the surface.

Another prior U.S. Pat. No. 4,227,404 to Jerry B. West dated Oct. 14, 1980, discloses a complex equipment arrangement which includes measurement of temperature down a borehole. However, the determination of temperature is only one of a large number of other sensors used for determining different data. And, the arrangement includes a complex tool which has DC power lines for transmitting the data from the tool located down hole, to the surface. Clearly, the arrangement includes electrical conductors in a cable that extends from the surface to the logging tool. And, it would be unacceptable for use with the method and system according to the applicants invention, since it would distort radio frequency fields that are existing during the temperature measurements according to applicants invention.

SUMMARY OF THE INVENTION

Briefly, the invention concerns a method for measuring temperature of an in situ heated earth formation in the presence of a radio frequency electromagnetic field. It comprises the steps of lowering a maximum registering thermometer into said earth formation, and holding said thermometer in said formation long enough to reach the ambient temperature. It also comprises raising said thermometer to the surface to read said maximum registered temperature.

Again briefly, the invention concerns apparatus for monitoring electromagnetic field strength during application of high intensity radio frequency energy to a subsurface formation by measuring the temperature at predetermined locations in said formation. It comprises in combination a maximum registering thermometer, and non-conductive flexible means for supporting said thermometer in said formation. It also comprises means for raising said thermometer to the surface at a rate sufficient to avoid any significant change if a higher temperature is passed.

Once more briefly, the invention concerns apparatus for monitoring electromagnetic field strength during application of high intensity radio frequency energy to a subsurface formation, by measuring the temperature at predetermined locations in a borehole in said formation. It comprises in combination a plurality of maximum registering thermometers, and non-conductive flexible line for supporting said thermometers in said borehole spaced at predetermined intervals. It also comprises reel means for lowering and raising said thermometers in said borehole. Each of the said thermometers comprises a highly conductive non-magnetic protective case having means for attaching said flexible line at either end thereof, and a window in said case for reading said thermometer. Each thermometer also comprises a glass capillary maximum registering type thermometer, and a rotatable sleeve cover operatively associated with said case for closing said window when said thermometer is in said borehole.

Again briefly, the invention concerns a method of monitoring the intensity of a radio frequency electromagnetic field in a subsurface earth formation having a borehole in said formation. It comprises lowering at least one maximum registering thermometer into said borehole to a predetermined depth therein in the presence of said electromagnetic field, and holding said thermometer at said predetermined depth for a temperature equilibration interval. It also comprises raising said thermometer to the surface at a rate sufficient to avoid any significant change in the maximum temperature registered.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 1 is a schematic showing of a borehole with a plurality of thermometers according to this invention extending therein;

FIG. 2 is an enlarged longitudinal elevation partly broken away in cross section and illustrating a thermometer mounted in a protective case according to the invention;

FIG. 3 is another enlarged longitudinal elevation like FIG. 2 but at right angles thereto, showing the maximum registering thermometer with the protective case window open; and FIG. 4 is a longitudinal cross section taken along the lines 4—4 of FIG. 3.

DESCRIPTION OF THE PREFERRED EMBODIMENTS

Heating of earth formations containing tar sands and oil shales has been proposed as a means of extracting the petroleum products without the expense and disturbance of the environment which conventional mining techniques would generate. There have been considerable theoretical studies supported by experimental work that dealt with the heating of earth formations by electromagnetic propagation at radio frequencies. In such procedures the formations of interest generally lie several tens or hundreds of feet below the earth's surface, and knowing the temperatures of the formations as they are heated is important for economical reasons. Furthermore, in the case of oil shales, the temperature information becomes critical inasmuch as the conversion of kerogen to petroleum (which is a temperature dependent chemical effect), is a highly non-linear time-temperature-production process. Also, the pattern of the above indicated electromagnetic propagation is an important operational control for the heating procedure. It has been determined that the electromagnetic field pattern can best be inferred from temperature gradients measured in the formations that are being heated.

A typical procedure for electromagnetic heating of subsurface earth formations begins in a manner very similar to a conventional oil well. First a suitable shallow hole is drilled into the earth and, surface casing is cemented in place, whereupon drilling through the cured cement to the depth of the formations of interest is carried out. After appropriate well head apparatus is installed, a special device called an "applicator" (not shown) is lowered into the well bore to the productive zone. The applicator can be considered as a radio frequency antenna and the piping supporting it in the well acts as the radio frequency transmission line. Taken together, the system when connected to a radio frequency transmitter becomes the means whereby radio frequency energy is applied by electromagnetic waves to the earth. Because of the effect the electrical characteristics of the rock materials have on the electromagnetic waves, this electrical energy is converted into heat energy.

By means of employing several selected boreholes each with its own applicator of radio frequency energy, and with proper operation the applicators can act in concert to control the region of maximum electromagnetic field strength, and thereby the heating of the formation. However, in order to maintain control of such a system, it would be necessary to have knowledge of the downhole electromagnetic field geometry. To do that, electromagnetic field sensors would need to be lowered into the wells. But, the sensors themselves as well as the connecting cables which are made of electrically conductive materials, would distort the electromagnetic field and act as "receiving antennas" to the radiated field. High currents could flow in these connecting lines and this might damage not only the cables and sensors but also the electromagnetic field measuring equipment.

It has been determined however, that a close correlation exists between electromagnetic field intensity and productive formation temperature. Consequently, if good temperature information can be obtained during the radio frequency propagation, the electromagnetic field pattern can be discerned.

There have been several techniques proposed for making thermal measurements in "monitor" wells. However, conventional thermocouples (which include their conductive wiring to the surface) suffer from the same sensitivity to induced currents which the radio frequency electromagnetic field would cause, as was the case in connection with the electromagnetic field probes mentioned above.

Another proposal would involve employing infrared monitoring of thermal radiation from the formation. But, such proposal suffers from servere attenuation of the optical signal which is coupled to the surface by fiber optic cables. Current technology for handling such signals under the expected temperature and distance conditions is not sufficient for being able to carry out that proposal.

This invention provides for overcoming the foregoing deficiencies of other methods for measuring temperature down hole, done in the presence of a strong radio frequency electromagnetic field. With reference to FIG. 1, there is schematically indicated a borehole 11 in a formation 12. There is a reel 15 that is mounted on a stand 16 at the surface near the well so that a plurality of maximum reading thermometers 20, 21 and 22 are supported down in the borehole 11 on a non-conductive flexible line 25. The line 25 passes over a pully 26 that is mounted on an arm 27 of the stand 16 to guide the flexible line 25 on and off of the reel 15.

It may be noted that the thermometers, e.g. thermometers 21 and 22 may be spaced at predetermined intervals apart. For example, there is an interval 29 that is indicated between corresponding points on each of the thermometers 21 and 22.

The procedure for measuring intensity of radio frequency electromagnetic field strength is based upon the relationship of such field strength to the temperature produced in the formation down hole. And consequently, the procedure involves lowering the thermometers e.g. 20, 21 and 22 into the borehole to predetermined depth locations therein. That is carried out in the presence of the radio frequency electromagnetic field that is producing the heating effects. The thermometers are held at the predetermined depth locations for a temperature equilibration interval, and following that time duration the thermometers are raised to the surface at a sufficient rate that will avoid any significant change in the maximum temperature which has been registered. Such rate need not be excessive because the thermometers are housed in metalic casings which are described in greater detail hereafter. And, the thermal inertia is sufficient to avoid any significant change during the brief transit time through any hotter zone.

The structure of one of the thermometers is illustrated in FIGS. 2, 3 and 4. It may be noted that the maximum registering thermometer, per se, is a glass capillary type thermometer 35 which is mounted in a protective case 36. As indicated in FIG. 3, the protective case 36 has a longitudinally extending window 40 so that the thermometer 35 may be read by observing the location of a mercury column 41 in relation to calibration markings 42 on the face of the glass thermometer 35.

It may be noted that the thermometer 35 per se, is a known type of instrument that employs special capillary structure (not shown) to permit one way movement of the mercury column 41 when the mercury expands with temperature increase. But, it must be subjected to centrifugal force or the like (usually by being "shaken down") to return the column 41 to a lower temperature indication after the temperature goes down again from a maximum.

The case 36 is made of highly conductive non-magnetic material and it has a pair of eyelets 46 and 47 at either end. These eyelets are for attaching the flexible line 25 thereto. While the eyelet 46 is integrally attached, e.g. by welding or the like to the lower end (as viewed in FIGS. 2 and 3) of the case 36 itself, the eyelet 47 is attached similarily but to a cap 49 that is threadedly attached to the upper end (as viewed in FIGS. 2 and 3) of the case 36.

There is a rotatable sleeve 52 that is constructed of highly conductive non-magnetic material, similar to that of the case 36. It has a cutout section 53, and the sleeve 52 is rotatable so as to permit reading of the thermometer. But, when the thermometer is located down hole for carrying out temperature measurements, the sleeve 52 may be rotated so as to close the window 40 for protection of the glass thermometer 35 therein.

Method

An example of a method according to this invention may be described in relationship to FIG. 1. However, it is to be understood that the method is for measuring temperature of an in situ heated earth formation, e.g. the formation 12 which is being heated in the presence of a radio frequency electromagnetic field (not shown).

The method comprises the steps of: (1) Lowering a maximum registering thermometer into the formation. For example, one of the thermometers 20, 21 or 22 will be lowered in borehole 11 into the formation 12.

(2) Holding said thermometer in said formation long enough to reach the ambient temperature. This step is clear from its terms. For example, the thermometers 20, 21 and 22 are lowered into the formation 12 to a predetermined depth therein. Then they are held at such positions long enough to reach the ambient temperature of the formation at each location in the borehole 11.

(3) Raising said thermometer to the surface to read said maximum registered temperature. This step is clear enough in its terms. The thermometer of concern i.e. 20 or 21 or 22, is raised to the surface by reeling in the line 25 on the reel 15. Then, at the surface the thermometer to be read will have the sleeve 52 rotated until the cutout section 53 registeres with the window 40 of the case 36. Thereafter, the maximum registered temperature will be read by observing the top of the mercury column 41 in the thermometer 35 as indicated by the index markings 42.

Another example of a method according to this invention may be described in terms of its being a method for monitoring the intensity of a radio frequency electromagnetic field in a subsurface earth formation. It will be clear that in such method the formation has a borehole therein. The method includes the steps of:

(1) Lowering at least one maximum registering thermometer into the borehole, e.g. bore-hole 11, to a predetermined depth therein and in the presence of the electromagnetic field (not shown).

(2) Holding said thermometer at such predetermined depth for a temperature equilibration interval. This of course, is clear from the terms of such step.

(3) Raising said thermometer to the surface at a rate sufficient to avoid any significant change in the maximum temperature registered. This step involves a reeling in on the line 25 to raise the thermometer of concern. At the same time the rate of such reeling is sufficiently rapid so as to avoid any significant temperature change (higher) from that already registered. This rate would be relatively flexible in its amplitude, since the protective case 36 along with the sleeve 52 provides quite considerable thermal capacity so that change in surrounding temperature would not raise the temperature of the thermometer bulb (not shown). In other words, the thermal inertia of the case and sleeve would avoid any change reaching and being effective to change the thermometer to a higher reading.

(4) It will be noted that the step of lowering a thermometer into the formation may include more than one thermometer in order to have the registrations of temperature at predetermined spaced distances apart. In such case, of course, the other steps of holding the thermometers and raising them thereafter, will apply to the total number being employed in the procedure.

While particular embodiments of the invention have been described above in considerable detail in accordance with the applicable statutes, this is not to be taken as in any way limiting the invention but merely as being descriptive thereof.

We claim:

1. Apparatus to aid in monitoring electromagnetic field strength during application of high intensity radio frequency energy to a subsurface formation by measuring the temperature at predetermined locations in a borehole in said formation, comprising in combination a plurality of maximum registering thermometers,
a non-electrically conductive flexible line for supporting said thermometers in said borehole spaced at predetermined intervals, and
reel means for lowering and raising said thermometers in said boreholes,
each of said thermometers comprising a highly electrically conductive non-magnetic protective case having means for attaching said flexible line at either end thereof, and
a window in said case for reading said thermometer,
a glass capillary maximum registering type thermometer, and
a rotatable sleeve cover operatively associated with said case for closing said window when said thermometer is in said borehole.

2. Method for measuring temperature of an in situ heated earth formation in the presence of a radio frequency electromagnetic field, comprising the steps of
suspending a maximum registering thermometer on an electrically non-conductive flexible line,
lowering said maximum registering thermometer into said earth formation,
holding said thermometer in said formation long enough to reach the ambient temperature, and
raising said thermometer to the surface to read said maximum registered temperature.

3. Method according to claim 2, wherein said step of raising said thermometer comprises a rate sufficient to avoid any significant change if a higher temperature is passed during the ascent.

4. Apparatus to aid in monitoring electromagnetic field strength during application of high intensity radio frequency energy to a subsurface formation by measuring the temperature at predetermined locations in said formation, comprising in combination a maximum registering thermometer,
non-electrically conductive flexible means for supporting said thermometer in said formation, and
means for raising said thermometer to the surface at a rate sufficient to avoid any significant change if a higher temperature is passed.

5. Apparatus according to claim 4, wherein said maximum registering thermometer comprises an electrically conductive non-magnetic case, and
a glass capillary maximum registering type thermometer located therein.

6. Apparatus according to claim 5, wherein said maximum registering thermometer also comprises a window in said case for reading said glass thermometer, and
a cover operatively associated with said case for closing said window to protect said glass thermometer when in said formation.

7. Method to aid in monitoring the intensity of a radio frequency electromagnetic field in a subsurface earth formation having a borehole in said formation, comprising lowering at least one maximum registering thermometer suspended on an electrically non-conductive flexible line into said borehole to a predetermined depth therein in the presence of said electromagnetic field, holding said thermometer at said predetermined depth for a temperature equilibration interval, and raising said thermometer to the surface at a rate sufficient to avoid any significant change in the maximum temperature registered.

8. Method according to claim 7, wherein said step of lowering comprises a plurality of maximum registering thermometers spaced at predetermined distances apart, and said steps of holding and raising include said plurality of thermometers.

* * * * *